US011263613B2

(12) United States Patent
Motoki (10) Patent No.: US 11,263,613 B2
(45) Date of Patent: *Mar. 1, 2022

(54) INFORMATION PROCESSING APPARATUS, INFORMATION PROCESSING SYSTEM, INFORMATION PROCESSING METHOD, AND INFORMATION PROCESSING PROGRAM

(71) Applicant: TOSHIBA TEC KABUSHIKI KAISHA, Tokyo (JP)

(72) Inventor: Fumiko Motoki, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,703

(22) Filed: Jul. 21, 2020

(65) Prior Publication Data
US 2021/0090054 A1 Mar. 25, 2021

(30) Foreign Application Priority Data
Sep. 24, 2019 (JP) .............................. JP2019-173378

(51) Int. Cl.
*G06Q 20/20* (2012.01)
*G08B 13/24* (2006.01)
*H04W 4/35* (2018.01)

(52) U.S. Cl.
CPC ......... *G06Q 20/203* (2013.01); *G06Q 20/202* (2013.01); *G06Q 20/208* (2013.01); *G08B 13/246* (2013.01); *H04W 4/35* (2018.02)

(58) Field of Classification Search
CPC .. G06Q 20/202; G06Q 20/208; G06Q 20/203; H04W 4/35; G08B 13/246
See application file for complete search history.

(56) References Cited

U.S. PATENT DOCUMENTS

| 6,725,206 B1 * | 4/2004 | Coveley | G01G 19/12 705/414 |
| 10,043,360 B1 * | 8/2018 | Mullins | G08B 13/19652 |

(Continued)

FOREIGN PATENT DOCUMENTS

JP 2018147252 A 9/2018

OTHER PUBLICATIONS

Extended European Search Report dated Feb. 15, 2021, mailed in counterpart European Application No. 20192052.7, 9 pages.

*Primary Examiner* — Daniel I Walsh
(74) *Attorney, Agent, or Firm* — Kim & Stewart LLP (57) ABSTRACT

According to an embodiment, an information processing apparatus, comprises a database configured to store a first list of commodities determined as having been removed from a store display shelf and a second list of commodities registered by a customer in a sales transaction using a mobile terminal. A processor is configured to detect that a commodity has been removed from a store display shelf based on entry of the commodity on the first list, detect a registration of the commodity by the customer in the sales transaction based on entry of the commodity on the second list, and measure an elapsed time from the time of detecting that the commodity has been removed from the store display shelf. When the elapsed time exceeds a threshold value without the registration of the commodity being detected, the processor causes an output of warning notification information.

16 Claims, 7 Drawing Sheets

(56) References Cited

U.S. PATENT DOCUMENTS

| | | | |
|---|---|---|---|
| 10,121,164 B2* | 11/2018 | Aoki | G06Q 30/0251 |
| 10,129,507 B2* | 11/2018 | Landers, Jr | G06Q 20/202 |
| 10,140,820 B1* | 11/2018 | Zalewski | G07G 1/0072 |
| 10,282,852 B1* | 5/2019 | Buibas | G06T 7/277 |
| 10,318,919 B2* | 6/2019 | Bermudez Rodriguez | G06Q 10/087 |
| 10,573,134 B1* | 2/2020 | Zalewski | G06Q 30/0633 |
| 10,876,717 B1* | 12/2020 | Parker | F21V 21/005 |
| 10,885,336 B1* | 1/2021 | Davis | G06N 7/005 |
| 2005/0131578 A1* | 6/2005 | Weaver | G06Q 10/087 700/244 |
| 2005/0168345 A1* | 8/2005 | Swafford | A47F 1/126 340/686.1 |
| 2005/0190072 A1* | 9/2005 | Brown | G06Q 30/02 340/6.1 |
| 2007/0067203 A1* | 3/2007 | Gil | G06Q 30/02 705/7.32 |
| 2009/0058644 A1* | 3/2009 | French | G08B 13/1472 340/568.2 |
| 2009/0066515 A1* | 3/2009 | Kangas | G08B 13/2417 340/572.1 |
| 2009/0138303 A1* | 5/2009 | Seshadri | G06Q 10/087 705/1.1 |
| 2009/0224040 A1* | 9/2009 | Kushida | G06Q 10/08 235/385 |
| 2009/0248198 A1* | 10/2009 | Siegel | G06Q 10/08 700/231 |
| 2012/0228240 A1* | 9/2012 | Gentile | A47F 5/0823 211/1 |
| 2013/0048724 A1* | 2/2013 | Burnside | G06Q 30/02 235/385 |
| 2013/0080279 A1* | 3/2013 | Daily | G06Q 20/208 705/23 |
| 2014/0201042 A1* | 7/2014 | Meyer | G06Q 10/087 705/28 |
| 2014/0258028 A1* | 9/2014 | Bynum | G06Q 90/20 705/26.8 |
| 2014/0316916 A1* | 10/2014 | Hay | A47F 9/048 705/17 |
| 2014/0324527 A1* | 10/2014 | Kulkarni | H04W 4/80 705/7.29 |
| 2015/0206188 A1* | 7/2015 | Tanigawa | G06K 9/00771 705/14.58 |
| 2015/0278588 A1* | 10/2015 | Matsumoto | G06K 9/00348 382/103 |
| 2016/0104175 A1* | 4/2016 | Fanourgiakis | G06Q 10/0637 705/7.29 |
| 2016/0203499 A1* | 7/2016 | Yamashita | G06Q 30/0201 705/7.29 |
| 2016/0253735 A1* | 9/2016 | Scudillo | G06Q 30/06 705/14.58 |
| 2017/0068945 A1* | 3/2017 | Tsuchimochi | G06Q 30/06 |
| 2018/0218317 A1* | 8/2018 | Ryan, III | G06Q 10/087 |
| 2018/0253604 A1 | 9/2018 | Hiramatsu et al. | |
| 2018/0260877 A1* | 9/2018 | Li | H04B 5/0062 |
| 2019/0088096 A1* | 3/2019 | King | G06K 9/00288 |
| 2019/0104866 A1* | 4/2019 | Kobayashi | G06K 9/00771 |
| 2019/0138975 A1* | 5/2019 | Zuberi | G06Q 30/06 |
| 2019/0147709 A1 | 5/2019 | Schoner | |
| 2019/0149725 A1* | 5/2019 | Adato | H04N 1/32144 348/158 |
| 2019/0205821 A1* | 7/2019 | Werner | G01G 19/42 |
| 2019/0236530 A1* | 8/2019 | Cantrell | G06K 9/00342 |
| 2019/0287096 A1* | 9/2019 | Wah | G06Q 20/204 |
| 2020/0005231 A1* | 1/2020 | Nakagawa | H04W 4/35 |
| 2020/0034812 A1* | 1/2020 | Nemati | G06Q 20/3276 |
| 2020/0327315 A1* | 10/2020 | Mullins | G06K 9/00771 |
| 2021/0090054 A1* | 3/2021 | Motoki | G07G 3/003 |

* cited by examiner

INFORMATION PROCESSING APPARATUS, INFORMATION PROCESSING SYSTEM, INFORMATION PROCESSING METHOD, AND INFORMATION PROCESSING PROGRAM

CROSS-REFERENCE TO RELATED APPLICATION

This application is based upon and claims the benefit of priority from Japanese Patent Application No. 2019-173378, filed on Sep. 24, 2019, the entire contents of which are incorporated herein by reference.

FIELD

Embodiments described herein relate generally to an information processing apparatus, an information processing system, an information processing method, and an information processing program.

BACKGROUND

There is an apparatus with which a customer moving about a store performs commodity registration and settlement processing by himself or herself using a cart-based point-of-sale (POS) terminal or another mobile POS terminal. A cart POS is a shopping cart mounted with an information processing terminal configured as a POS for self-registration. A mobile POS is an information processing terminal such as a tablet terminal or a smartphone installed with a POS software program or application for providing self-registration.

However, if the customer performs the commodity registration without monitoring, a malicious customer might commit an illegal act such as leaving the store without performing or completing the commodity registration.

DETAILED DESCRIPTION

In general, according to an embodiment, an information processing apparatus comprises a database and a processor. The database is configured to store a first list of commodities determined as having been removed from a store display shelf and a second list of commodities registered by a customer in a sales transaction using a mobile terminal. The processor is configured to detect that a commodity has been removed from a store display shelf based on entry of the commodity on the first list; detect a registration of the commodity by the customer in the sales transaction based on entry of the commodity on the second list; measure a first elapsed time from the time of detecting that the commodity has been removed from the store display shelf; and cause an output of warning notification information if the first elapsed time exceeds a first predetermined threshold time without the registration of the commodity being detected.

An information processing apparatus, an information processing system, an information processing method, and an information processing program according to certain example embodiments are explained below with reference to the drawings.

First Embodiment

Figure 1:
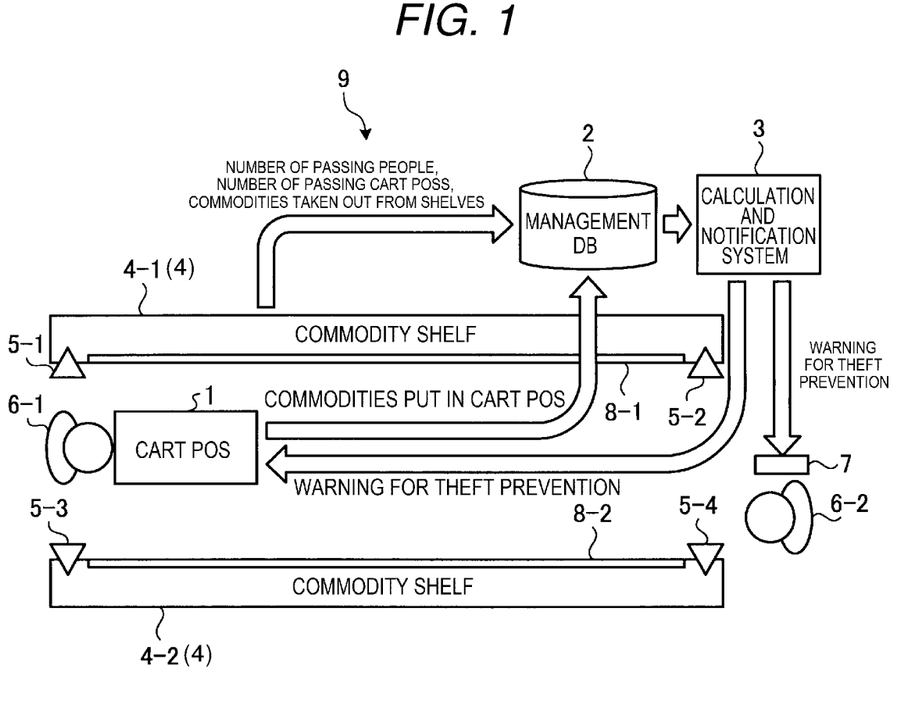
FIG. 1 is a diagram of a commodity theft preventing system according to a first embodiment.

In a first embodiment, a commodity theft preventing system 9, which is an example of an information processing system, is explained. FIG. 1 provides an overview of the commodity theft preventing system 9 according to the first embodiment. The commodity theft preventing system 9 includes, as illustrated in FIG. 1, a cart POS 1, a management database (DB) 2, a calculation and notification system 3, commodity shelves 4-1 and 4-2, and a warning device 7. In the following explanation, if the commodity shelves 4-1 and 4-2 do not need to be distinguished, then commodity shelves 4-1 and 4-2 may be simply referred to as commodity shelves 4 (or a commodity shelf 4, as appropriate).

The cart POS 1, the calculation and notification system 3, and commodity shelves 4 are respectively communicably connected to the management database (DB) 2. The calculation and notification system 3 is communicably connected to the cart POS 1 and the warning device 7. These connections may be wired connections or may be wireless connections. As wireless communication protocols, a 3G line, a 4G line, Wi-Fi®, Bluetooth®, and the like are usable as appropriate. These connections may intranet (private line connections) or may be via an open line such as the Internet.

Figure 2:
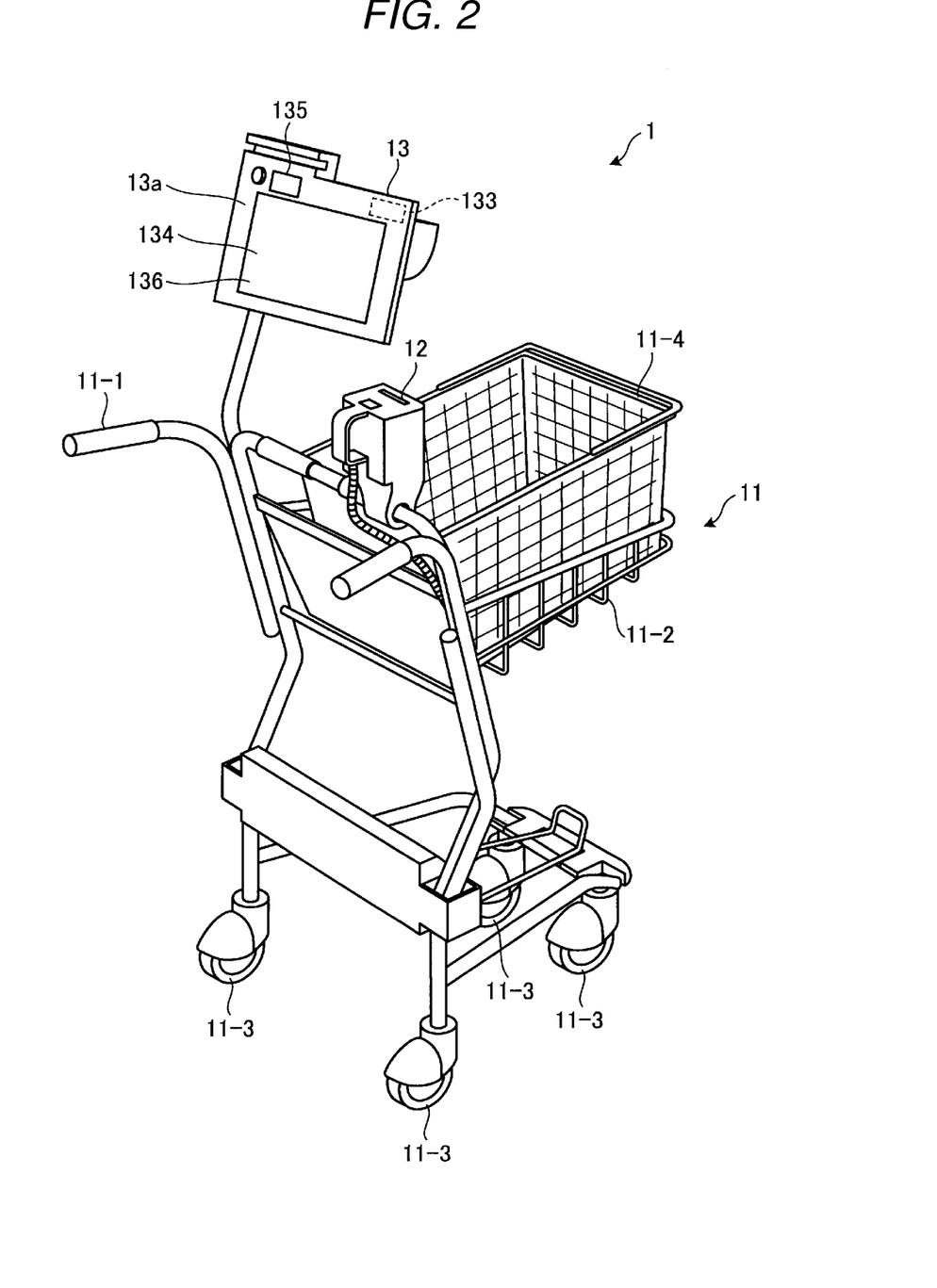
FIG. 2 is a diagram illustrating an example of the configuration of a cart POS.

The cart POS 1 is a shopping cart on which is mounted a POS terminal for self-registration. The cart POS 1 can be used for carrying commodities around a store such as a supermarket. FIG. 2 is a diagram illustrating an example of the configuration of the cart POS 1. The cart POS 1 includes a cart 11, a scanner device 12, and a cart terminal 13.

The cart 11 includes a handle 11-1, a basket placing section 11-2, a plurality of casters 11-3, and a basket 11-4. The handle 11-1 can be a part gripped by a customer 6 to move the cart 11. The basket placing section 11-2 is a table-like portion or the like on which the basket 11-4 for storing commodities can be placed. A plurality of casters 11-3 (four casters 11-3, in this example) are provided for the cart 11. The number of casters 11-3 may be any number of one or more. The respective casters 11-3 individually rotate about the vertical axis. Therefore, the cart 11 can be pushed by the customer 6 to freely move in the store.

The scanner device 12 is an example of a portable scanner device. The scanner device 12 is attached to the cart 11 and moves with the cart 11. The scanner device 12 is, for example, a device capable of detecting (reading) IC (integrated circuit) tags attached to commodities. For example, radio frequency identification (RFID) tags. The scanner device 12 reads information (for example, commodity codes) stored in the IC tags for identifying the commodities. As the scanner device 12, a device that reads a code symbol (information for specifying a commodity) such as a barcode attached to a commodity being purchased by the customer 6 may be used. The scanner device 12 optically reads the code symbol. In this context, optical reading includes imaging or photographing the commodity. The scanner device 12 decodes the code symbol that has been read and thus extracts a commodity code included in the code symbol. The scanner device 12 transmits the extracted commodity code to the cart terminal 13. The scanner device 12 may be detachably attached to the cart 11.

The cart terminal 13 is an example of an information processing terminal. The cart terminal 13 is attached to the cart 11 and moves with the cart 11. The cart terminal 13 includes a main body unit 13*a*, a display 134, a speaker 135, and an operation unit 136. The main body unit 13*a* is a thin box-like housing, an opening in which is provided in a surface facing towards the customer 6 who operates the cart 11. The display 134 is a tabular display device such as a liquid crystal display. The display 134 is disposed in the opening of the main body unit 13*a*. The speaker 135 outputs various kinds of sound such as guidance voice, operation sound, and warning sound. The speaker 135 is disposed, for example, around the opening of the main body unit 13*a*. The operation unit 136 is a touch input device (a touch panel) superimposed on the surface of the display 134. The cart terminal 13 is, for example, a tablet computer (also referred to as a tablet terminal).

The cart terminal 13 is communicably connected to the scanner device 12 by wire or radio. The cart terminal 13 acquires, based on a code symbol (more particularly a commodity code encoded in the code symbol) read by the scanner device 12, commodity information (e.g., a commodity name, a price, and the like) corresponding to the commodity code and executes sales registration processing accordingly. The sales registration processing in this context refers to the processing associated with reading out, based on a commodity code read by the scanner device 12, commodity information for the commodity corresponding to the commodity code from a commodity master and then registering (storing) the commodity information in a commodity registration table. The cart terminal 13 transmits the commodity code read by the scanner device 12, or commodity information corresponding to the commodity code, to the management DB 2.

Figure 3:
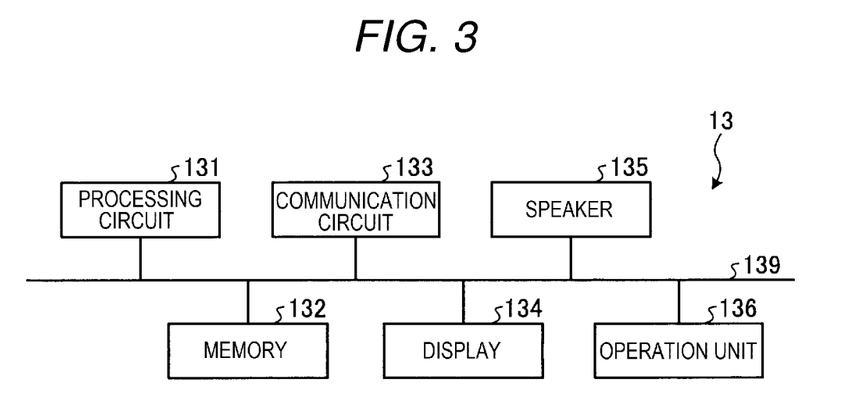
FIG. 3 is a diagram illustrating an example of the configuration of a cart terminal.

FIG. 3 is a block diagram illustrating an example of the configuration of the cart terminal 13 illustrated in FIG. 2. As illustrated in FIG. 3, the cart terminal 13 further includes a processing circuit 131, a memory 132, and a communication circuit 133. The processing circuit 131, the memory 132, the communication circuit 133, the display 134, the speaker 135, and the operation unit 136 are communicably connected, for example, via a bus 139.

The processing circuit 131 controls the overall operation of the cart terminal 13. As the processing circuit 131, for example, a CPU (Central Processing Unit) is used. However, other processors such as a GPU (Graphics Processing Unit), an ASIC (Application Specific Integrated Circuit), and an FPGA (Field Programmable Gate Array) may be used in other examples.

The memory 132 stores various data and programs used in the cart terminal 13. The data stored in the memory 132 includes a commodity master and a commodity registration table. The commodity master stores commodity information (e.g., commodity names, prices, and the like) of commodities in correspondence with the commodity codes. The commodity registration table stores commodity information of the commodities read by the scanner device 12. The programs stored in the memory 132 include a client side commodity theft preventing program further explained below. As the memory 132, various storage media such as an HDD (Hard Disk Drive), an SSD (Solid State Drive), and a Flash memory are usable A RAM (Random Access Memory) that temporarily stores data during work is further provided in the memory 132.

The communication circuit 133 performs communication between the cart terminal 13 and external devices. As the communication circuit 133, a communication circuit for wired communication, a communication circuit for wireless communication, and a combination of the communication circuit for wired communication and the communication circuit for wireless communication are usable as appropriate.

Figure 4:
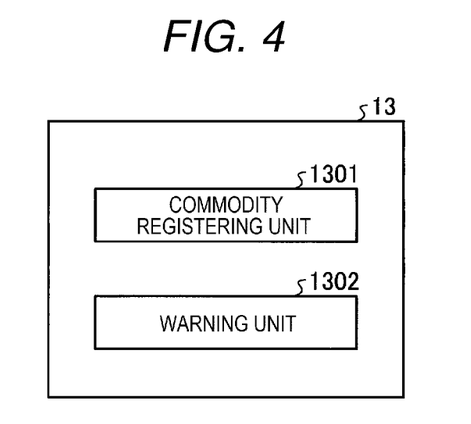
FIG. 4 is a diagram illustrating functional aspects of a cart terminal.

FIG. 4 is a diagram illustrating an example of the functions of the cart terminal 13. For example, the processing circuit 131 executes the client side commodity theft preventing program loaded to the memory 132, whereby the cart terminal 13 realizes functions of a commodity registering unit 1301 and a warning unit 1302.

The commodity registering unit 1301 receives a commodity code, or alternatively commodity information, from the scanner device 12 and supplies the received commodity code (or commodity information) to the management DB 2.

The warning unit 1302 receives notification information from the calculation and notification system 3 and executes a warning operation for theft prevention according to the received notification information. The warning operations by the warning unit 1302 are not limited to operations for warning about theft to a customer 6-1 or other customers around the customer 6-1 and includes operations for urging the customer 6-1 to read/scan a commodity. As a warning operation, the warning unit 1302 outputs warning sound from the speaker 135. As the warning sound, voice (speech) may be used. As the warning operation, the warning unit 1302 may display a warning image on the display 134.

Figure 5:
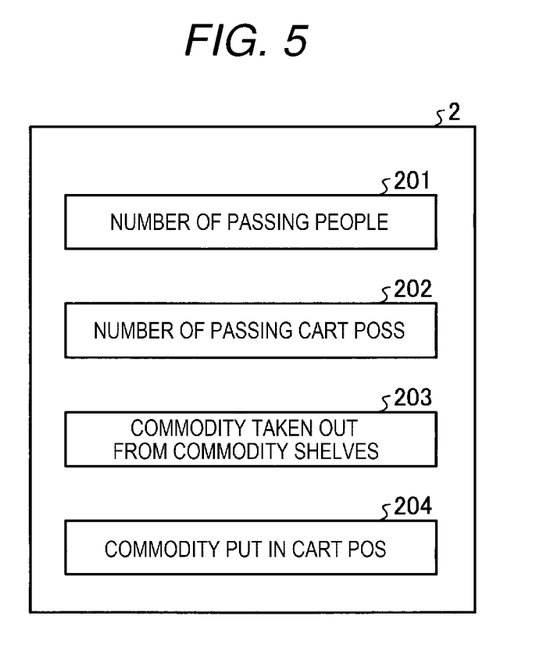
FIG. 5 depicts a configuration of data retained by a management database.

The management DB 2 stores various data used in the commodity theft preventing system 9. FIG. 5 is a diagram illustrating an example of a data stored by the management DB 2. As illustrated in FIG. 5, the management DB 2 stores a number of passing people 201, a number of passing cart POSs 202, a commodity list 203 of commodities removed (taken out) from the commodity shelves, and a commodity list 204 of commodities put in a cart POS. The management DB 2 receives, from the commodity shelves 4, the number of passing people 201, the number of passing cart POSs 202, and each commodity to be included on the commodity list 203 removed from the commodity shelves 4. The management DB 2 receives, from the cart POS 1, each commodity that has been put in (scanned/read) by a listed cart POS on the commodity list 204. The number of passing people 201 is the number of customers 6-1 passing in front of passage sensors 5 of the commodity shelves 4. The number of passing cart POSs 202 is the number of cart POSs 1 passing in front of the passage sensors 5 of the commodity shelves 4. The commodity list 203 has commodity codes (or commodity information corresponding to the commodity codes) for those commodities removed from the commodity shelves 4. The commodity list 204 includes a commodities code (or commodity information corresponding thereto) of each commodity read (more particularly, registered) by the cart POS 1.

As the management DB 2, for example, a server computer or a memory system incorporating a large-capacity storage device is usable. The management DB 2 may be a large-capacity storage device communicably connected to a computer via a cable or a communication network. As these storage devices, an HDD, an SSD, an integrated circuit storage device, and the like are usable as appropriate.

The calculation and notification system 3 is an information processing apparatus. The calculation and notification system 3 determines whether removed commodities are read by the cart POS 1 within some predetermined time from removal from the commodity shelves 4. If commodity registration is not performed within the predetermined time, the calculation and notification system 3 generates notification information for warning of a theft of the commodity. The notification information may be or include notification information for urging the reading of the removed commodity. The calculation and notification system 3 sends the generated notification information to the cart POS 1 and the warning device 7.

Figure 6:
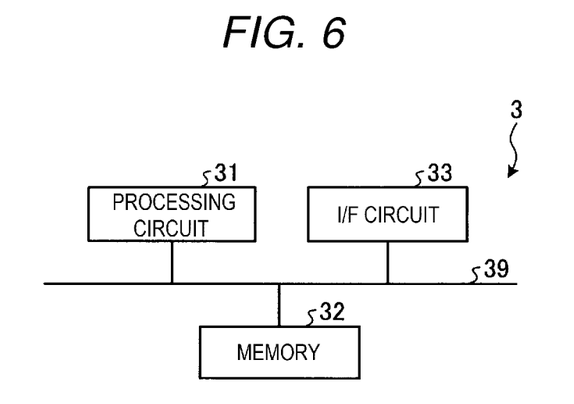
FIG. 6 is a diagram illustrating aspects of the configuration of a calculation and notification system.

FIG. 6 is a diagram illustrating an example of the configuration of a calculation and notification system 3. As illustrated in FIG. 6, the calculation and notification system 3 includes a processing circuit 31, a memory 32, and an I/F circuit 33. The processing circuit 31, the memory 32, and the I/F circuit 33 are, for example, communicably connected via a bus 39.

The processing circuit 31 controls the overall operation of the calculation and notification system 3. For example, a CPU can be used as the processing circuit 31. However, other processors such as a GPU, an ASIC, and an FPGA may be used.

The memory 32 stores various data and programs used in the calculation and notification system 3. The programs stored in the memory 32 include a server side commodity theft preventing program further described below. As the memory 32, various storage media such as an HDD, an SSD, and a Flash memory are usable. A RAM that temporarily stores data during work is further provided in the memory 32.

The I/F circuit 33 includes an input circuit and a communication circuit. The input circuit is a circuit that receives an input from a user. For example, a touch panel and/or a keyboard can be the input circuit. The communication circuit is a circuit for communicating with external devices.

Figure 7:
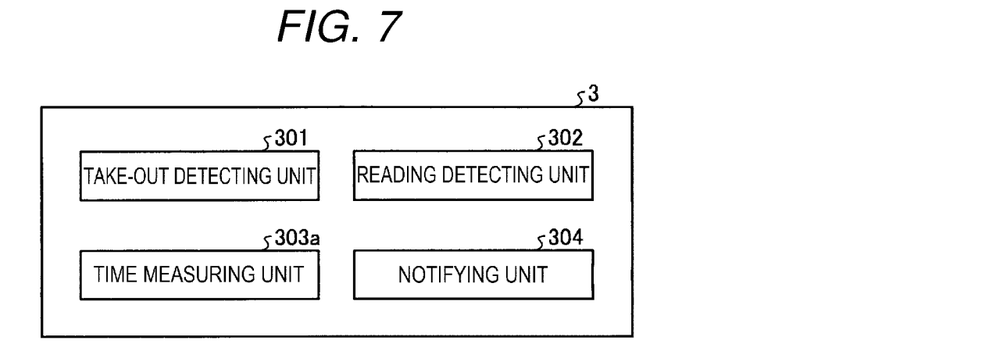
FIG. 7 depicts functional aspects of a calculation and notification system.

FIG. 7 is a diagram illustrating an example of the functional aspects of the calculation and notification system 3. For example, the processing circuit 31 executes the server side commodity theft preventing program loaded to the memory 32, whereby the calculation and notification system 3 realizes functions of a take-out detecting unit 301, a reading detecting unit 302, a time measuring unit 303$a$, and a notifying unit 304.

The take-out detecting unit 301 detects a particular commodity has been removed from the commodity shelf 4 by referring to the commodity list 203 of the management DB 2.

The reading detecting unit 302 detects, by referring to the commodity list 204, that a commodity has been read in the cart POS 1. The reading detecting unit 302 detects, by referring to the commodity list 204 of the management DB 2, which commodity has been read by the cart POS 1.

The time measuring unit 303$a$ measures an elapsed time from when a commodity is removed from the commodity shelf 4 until detected by the reading detecting unit 302. The time measuring unit 303$a$ measures the elapsed time, for example, using a clock of the processing circuit 131. The elapsed time from when the reading detecting unit 302 detected the commodity was removed from the commodity shelf 4 is an example of a first elapsed time.

The notifying unit 304 generates notification information for executing a warning operation for warning a theft. The notifying unit 304 generates the notification information if commodities having the same commodity code are not read by the cart POS 1 within a predetermined time from when the commodities were removed from the commodity shelves 4. In other words, the notifying unit 304 generates notification information for instructing a warning of a theft. The notifying unit 304 sends the generated notification information to the warning unit 1302 and the warning device 7. For example, the notifying unit 304 sends notification information for instructing a warning urging a reading of a commodity or a warning of a theft of a commodity to the warning unit 1302. For example, the communicating unit 304 supplies notification information for instructing a warning of a likelihood of a theft or a theft to the warning device 7.

The explanation of the commodity theft preventing system 9 according to this embodiment is continued with reference to FIG. 1 again.

The plurality of commodity shelves 4-1 and 4-2 are shelves on which a plurality of commodities are displayed. The commodity shelves 4 include a plurality of passage sensors 5-1, 5-2, 5-3, and 5-4 and a plurality of commodity sensors 8-1 and 8-2. In the following explanation, if the plurality of passage sensors 5-1, 5-2, 5-3, and 5-4 are not distinguished from each other, the plurality of passage sensors 5-1, 5-2, 5-3, and 5-4 are simply described as passage sensors (or a passage sensor) 5. In the following explanation, if the plurality of commodity sensors 8-1 and 8-2 are not distinguished, the plurality of commodity sensors 8-1 and 8-2 are simply described as commodity sensors (commodity sensor) 8.

The plurality of passage sensors 5 are set, for example, at ends of the commodity shelves 4 and detect the number of people and the number of cart POSs passing the fronts of the commodity shelves 4. The plurality of passage sensors 5 are provided, for example, at both ends of the commodity shelves 4 but may be provided in the centers of the commodity shelves 4 or may be provided in any positions of the front surfaces (display ranges) of the commodity shelves 4.

As the passage sensors 5 means for analyzing an image obtained by performing imaging with a camera to thereby detect the number of passing peoples and the number of passing cart POSs can be used, for example.

As the passage sensors 5$a$ photosensor such as an infrared sensor may be used, for example. In this case, the number of passing people and the number of passing cart POSs are detected according to, for example, a change in light reception intensity of light irradiated from one of two passage sensors 5-1 and 5-3 to the other. It may be determined, according to, for example, a time width in which the light reception intensity decreases, whether a person or the cart POS 1 is passing.

As the passage sensors 5, means for detecting the cart POS 1 or the like using, for example, BLE® (Bluetooth Low Energy) may be used.

In general, the commodity shelves 4 provide the number of people and the number of cart POSs passing by the ends of the commodity shelves as detected by the passage sensors 5 to the management DB 2 together with, for example, codes for identifying the commodity shelves 4.

The plurality of commodity sensors 8 detect take-out or return of displayed commodities. As the commodity sensors 8, sensors capable of detecting IC tags attached to commodities is usable. The commodity sensors 8, which are the sensors for the IC tags, are provided, for example, on take-out or return sides of racks of the commodity shelves 4. The sensors for IC tags may be disposed at least in two rows and configured to be capable of detecting moving directions of the IC tags. As the commodity sensors 8, means for analyzing an image obtained by performing imaging with a camera to thereby detect take-out or return of commodities may be used or means for detecting take-out or return of commodities based on a change in outputs of weight sensors or photosensors disposed in display positions of the commodities may be used. The commodity shelves 4 supply, to the management DB 2, commodity codes or commodity information of commodities removed from the shelves and commodities returned to the shelves as detected by the commodity sensors 8.

The warning device 7 receives the notification information from the calculation and notification system 3 and performs a warning for theft prevention according to the received notification information. The warning for theft prevention by the warning device 7 is not limited to operation for warning a store clerk 6-2 about a theft by the customer 6-1 and includes operation for warning the store clerk 6-2 that reading/registering of a commodity by the customer 6-1 is late or a theft by the customer 6-1 appears likely to occur. As the warning device 7, a speaker that outputs warning sound according to the notification information is usable. As the warning sound, voice may be used. As the warning device 7, a display device that performs visual display(s) according to the notification information, an illuminating device that emits warning light(s) (or the like) according to the notification information, or the like may be used.

With the cart POS 1, the customer 6-1 moving about the store can perform commodity reading (that is, product registration for a sales transaction) and also checkout processing (that is, transaction settlement/payment processing for the sales transaction) for commodities without the aid of a store clerk, cashier, or the like.

However, if the customer 6-1 performs the commodity registration alone, a malicious customer 6-1 could commit an illegal act such as leaving the store without appropriately performing the commodity registration.

Therefore, the commodity theft preventing system 9 according to this embodiment is configured to be capable of detecting and/or deterring a leaving of the store with a commodity without performing commodity registration processing for the commodity. Specifically, the commodity theft preventing system 9 is a system that 4 warns of a theft (or possible a theft) if a commodity registration is not performed within some predetermined time after commodities are removed from the commodity shelves 4. The commodity theft preventing system 9 promotes theft prevention. Consequently, since a warning is emitted if a customer using the cart POS 1 attempts to steal a commodity, a reduction in commodity theft losses can be expected.

Commodity theft prevention processing according to the embodiment is explained with reference to the drawings. The commodity theft prevention processing is, for example, server and client processing. The server processing is processing executed by the calculation and notification system 3, for example. The client processing is processing executed by the cart terminal 13, for example.

Figure 8:
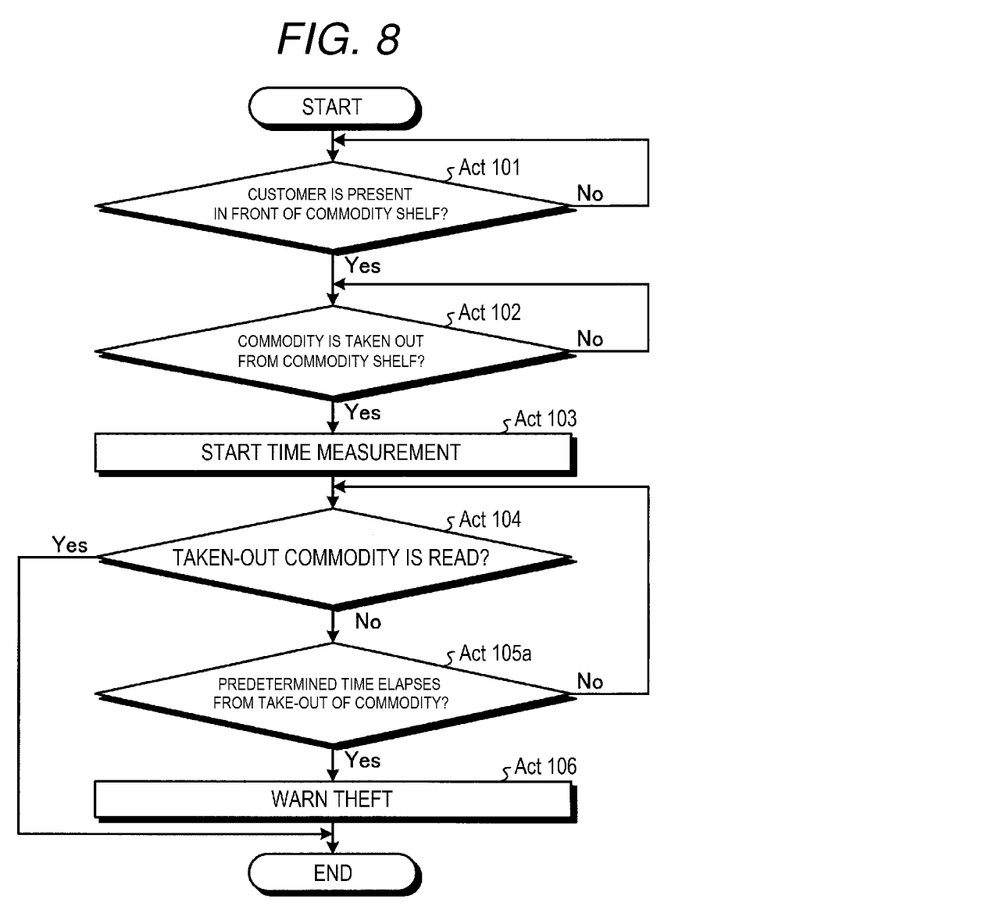
FIG. 8 is a flowchart illustrating an example of commodity theft prevention processing executed by a commodity theft preventing system according to a first embodiment.

FIG. 8 is a flowchart illustrating an example of the commodity theft prevention processing executed by the commodity theft preventing system 9.

The take-out detecting unit 301 determines, by referring to the number of passing people 201 or the number of passing cart POSs 202 in the management DB 2, whether a customer 6-1 is in front of a commodity shelf 4 (Act 101). This can be determined according to whether the customer 6-1 passes by an end of a commodity shelf 4 after previous passing an end of the commodity shelf 4. Whether the customer 6-1 is present in front of a commodity shelf 4 can be determined by whether the customer 6-1 has been detected as entering or exiting an aisle between commodity shelves 4 or otherwise a passage adjacent to a commodity shelf 4. If the customer 6-1 is not present in front of the commodity shelf 4 (No in Act 101), the take-out detecting unit 301 stays on standby until the customer 6-1 is determined to be present in front of the commodity shelf 4.

It is assumed here that, if the passage sensor 5 detects that a cart POS 1 or a customer 6-1 passes an end of the commodity shelf 4, a detection result (the number of passing cart POSs or the number of passing people) in the management DB 2.

If the customer 6-1 is present in front of the commodity shelf 4 (Yes in Act 101), the take-out detecting unit 301 determines, by referring to the commodity list 203 of the management DB 2, whether a commodity has been removed from the commodity shelf 4 (Act 102). If a commodity has not been removed (No in Act 102), the take-out detecting unit 301 stays on standby until a commodity is removed.

It is assumed that, when the commodity sensor 8 detects that a commodity is removed, the commodity shelves 4 store a detection result (an indication that a particular commodity has been removed from a commodity shelf) in the management DB 2.

If a commodity is removed (Yes in Act 102), the time measuring unit 303a starts measuring an elapsed time (a first elapsed time) starting from when the take-out detecting unit 301 detects the commodity has been removed from the commodity shelf 4 (Act 103).

Subsequent to Act 103, the reading detecting unit 302 determines, by referring to the commodity list 204 of the management DB 2, whether the removed commodity has been read (registered) by the cart POS 1 (Act 104). If the removed commodity has been registered (Yes in Act 104), the reading detecting unit 302 ends the processing.

It is assumed that, when the commodity is read, the commodity registering unit 1301 of the cart POS 1 stores a commodity code or the like for the read commodity in the management DB 2.

If the removed commodity has not been registered (No in Act 104), the notifying unit 304 determines whether a predetermined time has elapsed from when the removed commodity was detected (Act 105a). This determination is performed by, for example, determining whether an elapsed time is equal to or greater than the predetermined time. It is assumed that the predetermined time is, for example, set in advance and stored in the memory 32 or the like. If the predetermined time from removal of the commodity has not yet elapsed (No in Act 105a), the notifying unit 304 returns to Act 104.

On the other hand, if the predetermined time has elapsed (Yes in Act 105a), commodity theft preventing system 9 emits a warning (Act 106) since a theft is possible. Specifically, the notifying unit 304 generates notification information for instructing a warning for urging a reading of a commodity, for example, and this notification can be sent to the cart POS 1. The notifying unit 304 also generates notification information for instructing a warning of a possible theft, for example, and this notification can be sent to the warning device 7. The notifying unit 304 outputs the generated notification information. That is, the notifying unit 304 sends the generated notification information to the cart POS 1 and the warning device 7.

The cart POS 1 and the warning device 7 execute a warning operation for theft prevention according to the received notification information. As the warning operation executed by the cart POS 1 and the warning device 7, for example, output of warning sound is usable. Voice may be used as the warning sound. The warning operation is not limited to the output of the warning sound. Various operations that can present a warning to the store clerk 6-2 (a user on the store side) such as display of a warning image on a display or the like and lighting (flashing or a change of a lighting color) of a warning lamp are usable as appropriate. The warning device 7 may present, in the warning operation, the present position of a target cart POS 1, the position of a target commodity shelf 4, or information for specifying a target commodity to the user such as the store clerk 6-2. The present position of the target cart POS 1 may be acquired based on, for example, position information of an access point of Wi-Fi or the like to which the cart terminal 13 is connected or may be acquired based on a signal that the cart terminal 13 receives from a beacon in the store. The position of the target commodity shelf 4 can be acquired based on, for example, identification codes output by the commodity shelves 4 (or other information provided for specifying each of the commodity shelves 4). In the warning operation, the target cart POS 1 may be photographed by a security camera and an image thus obtained by the photographing may be sent to a user such as the store clerk 6-2.

The notification information may be sent to one or both of the warning device 7 or the cart POS 1. In other words, the warning operation will be executed by at least one of the warning device 7 and the cart POS 1.

In this way, if commodity registration is not performed at the cart POS 1 within the predetermined time from when the removal of the commodity from the commodity shelf 4 was detected, the commodity theft preventing system 9 according to this embodiment causes the cart POS 1 and the warning device 7 to execute a warning operation for theft prevention. Consequently, the commodity theft preventing system 9 can warn the customer 6-1 who attempts to execute an illegal act and cause the store clerk 6-2 to recognize the presence of the customer 6-1. The customer 6-1 receiving the warning and thus being urged to read a commodity will presumably understand that the store recognizes the absence of commodity registration. Therefore, theft can be prevented or reduced by the warning and the urging of the reading of unregistered items. With the warning for urging the reading, it is possible to prevent the customer 6-1, who does not intend to commit a theft, such as a customer who forgets the reading or a customer who simply takes a long time in the registering of the item, from being warned about a possible theft and prevent discomfort from being given to the customer 6-1. The store clerk 6-2, who recognizes the presence of the customer 6-1, can take measures for suppressing a theft of a commodity, for example, watch the customer 6-1. In other words, with the commodity theft preventing system 9 according to this embodiment, it is possible to prevent a theft of a commodity.

It is also possible to realize specifications in which two or more elapsed times are set as predetermined times, a warning for urging reading of item can be provided if a first elapsed time elapses, and a theft warning can be provided if a second, longer elapsed time elapses.

Second Embodiment

In the first embodiment explained above, the commodity theft preventing system 9 executes the warning operation according to the elapsed time from when the removal of the commodity is detected (the commodity is taken out from a shelf). However, embodiments are not limited to this. For example, the warning operation may be executed according to movement of the cart POS 1.

Figure 9:
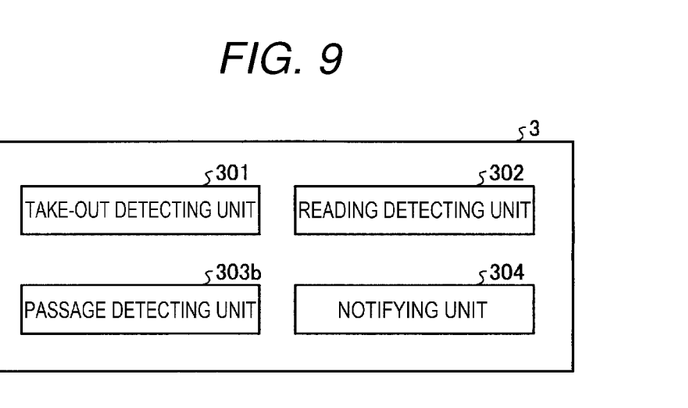
FIG. 9 depicts functional aspects of a calculation and notification system according to a second embodiment.

FIG. 9 is a diagram illustrating an example of functions of the calculation and notification system 3 according to a second embodiment. As illustrated in FIG. 9, for example, the processing circuit 31 executes a commodity theft preventing program on a server side loaded to the memory 32, whereby the calculation and notification system 3 further realizes a function of a passage detecting unit 303b. The calculation and notification system 3 may include the function of the time measuring unit 303a illustrated in FIG. 7.

The passage detecting unit 303b detects, by referring to the number of passing cart POSs 202 in the management DB 2, the cart POS 1 passing the commodity shelf 4. In this context, the cart POS 1 "passing the commodity shelf 4" means that the cart POS 1 that was present in front of the commodity shelf 4 when a commodity was removed from the shelf, moves away from in the front of the commodity shelf 4.

Figure 10:
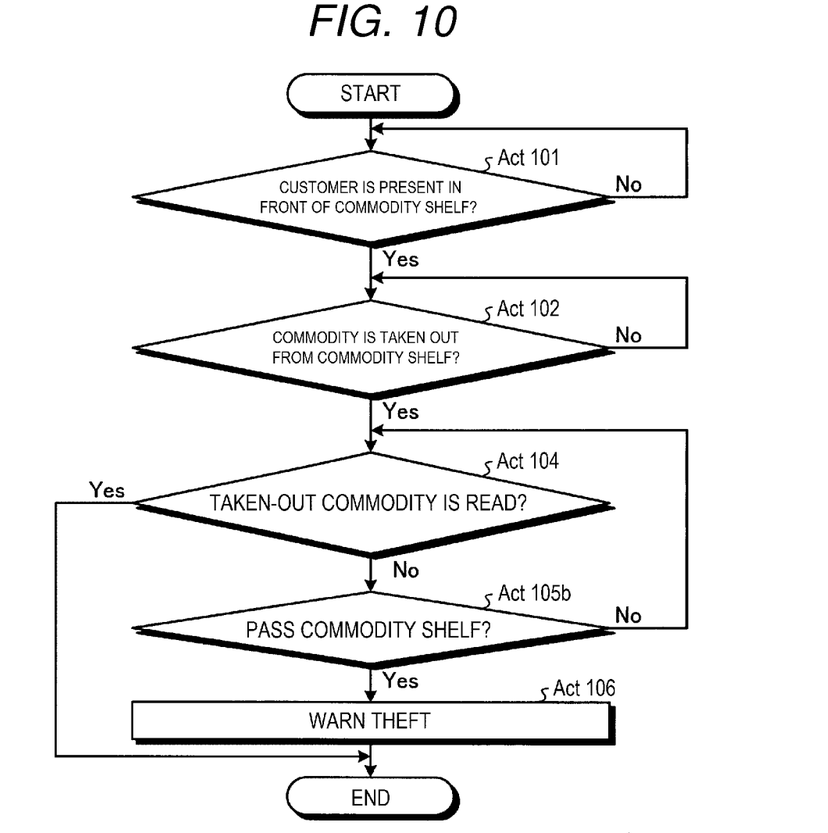
FIG. 10 is a flowchart illustrating an example of commodity theft prevention processing according to a second embodiment.

FIG. 10 is a flowchart illustrating an example of commodity theft prevention processing according to the second embodiment. In the processing illustrated in FIG. 10, the processing in Act 103 in FIG. 8 is not executed and processing in Act 105b is executed instead of the processing in Act 105a in FIG. 8.

If commodity registration of the removed commodity is not detected (No in Act 104), the passage detecting unit 303b determines, by referring to the number of passing people 201 and the number of passing cart POSs 202 in the management DB 2, whether a cart POS 1 was passing a commodity shelf 4 from which a commodity was removed is detected (Act 105b). If a passing cart POS 1 is not detected (No in Act 105b), the passage detecting unit 303b returns to Act 104. On the other hand, if a passing cart POS 1 is detected (Yes in Act 105b), the commodity theft preventing system 9 warns of a theft or likelihood of a theft (Act 106).

In this way, after the commodity removed from the commodity shelf 4 is detected, if a cart POS 1 passing the commodity shelf 4 is detected without a commodity registration being performed, the commodity theft preventing system 9 according to this embodiment causes the cart POS 1 and the warning device 7 to execute a warning operation for theft prevention. With this configuration, the same effects as the effects in the first embodiment are substantially obtained.

The technique according to this second embodiment can be combined with the technique according to the first embodiment.

Third Embodiment

Figure 11:
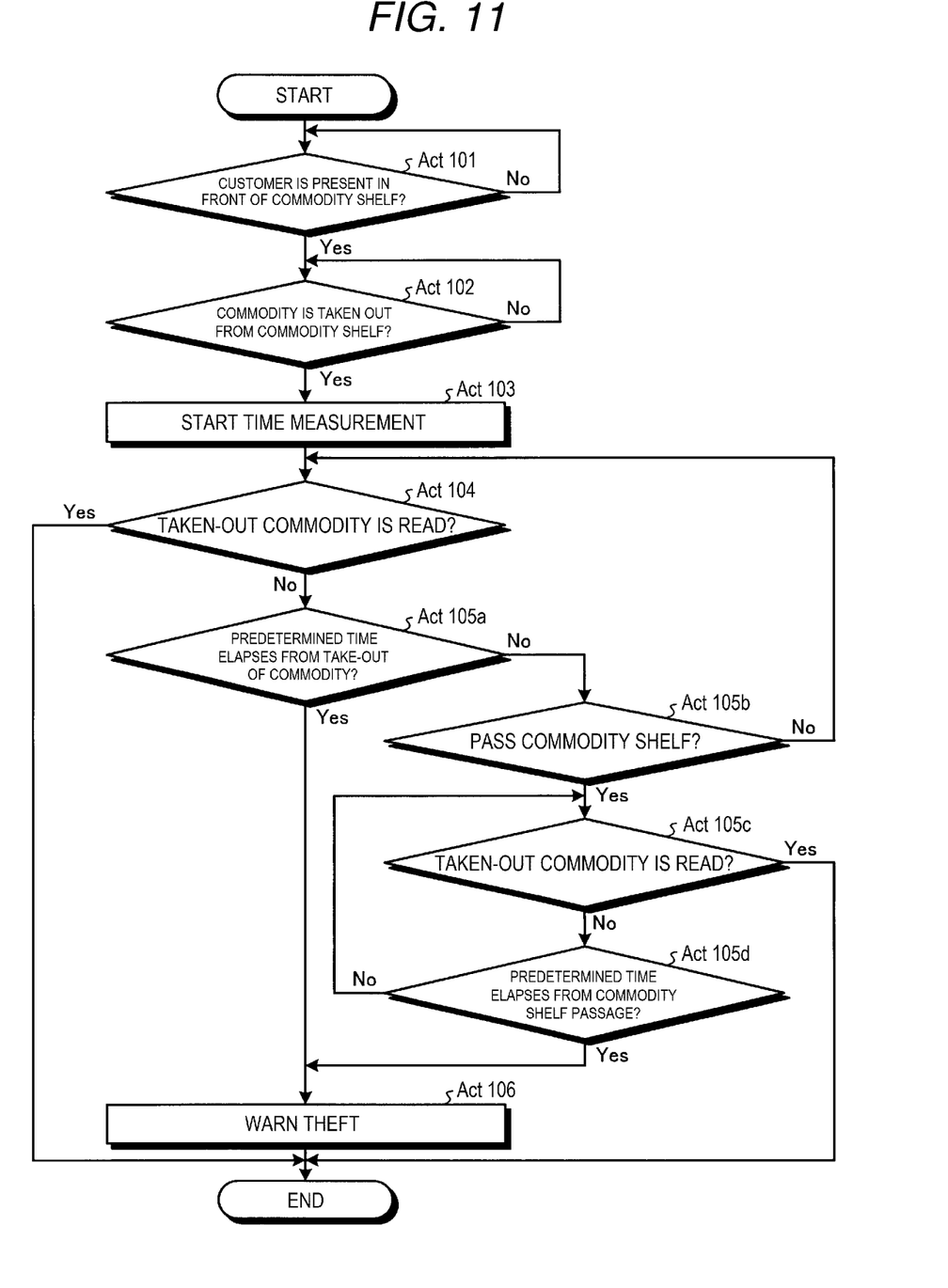
FIG. 11 is a flowchart illustrating an example of commodity theft prevention processing according to a third embodiment.

A warning operation may be executed according to an elapsed time from when a taken-out (removed) commodity is detected and movement of the cart POS 1. FIG. 11 is a flowchart illustrating an example of commodity theft prevention processing according to a third embodiment. In the processing illustrated in FIG. 11, if the predetermined time has not elapsed from when the taken-out commodity was detected in the processing of FIG. 8 (No in Act 105a), the processing in Act 105b in FIG. 10 is executed.

If the cart POS 1 does not pass the commodity shelf 4, from which the commodity has been taken out, (No in Act 105b), the passage detecting unit 303b returns to Act 104. On the other hand, if the cart POS 1 passes the commodity shelf 4, from which the commodity is taken out, (Yes in Act 105b), as in Act 104 in FIG. 8, the reading detecting unit 302 determines whether the taken-out commodity has been registered (Act 105c). If the taken-out commodity is registered (Yes in Act 105c), the reading detecting unit 302 ends the processing. On the other hand, if the taken-out commodity is not registered (No in Act 105c), the notifying unit 304 determines whether a predetermined time elapses from when the cart POS 1 passing the commodity shelf 4, from which the commodity is taken out, is detected (Act 105d). The time measuring unit 303a may measure an elapsed time from when the commodity shelf 4 passage is detected or may calculate, based on an elapsed time from when the taken-out commodity is detected and time when the cart POS 1 passing the commodity shelf 4 is detected, an elapsed time from when the cart POS 1 passing the commodity shelf 4 is detected. The elapsed time from when the cart POS 1 passing the commodity shelf 4 is detected is an example of a second elapsed time. The predetermined time only has to be, for example, set in advance and stored in the memory 32 or the like. If the predetermined time has not elapse from when passing of the commodity shelf 4 by the cart POS 1 was detected (No in Act 105d), the notifying unit 304 returns to Act 105c. On the other hand, if the predetermined time has elapsed (Yes in Act 105d), the commodity theft preventing system 9 warns a theft or likelihood of a theft (Act 106).

In this way, after the commodity removal from the commodity shelf 4 is detected, if a predetermined time elapses without the commodity registration being performed or if the cart POS 1 is detected passing the commodity shelf 4, the commodity theft preventing system 9 according to this embodiment causes the cart POS 1 and the warning device 7 to execute the warning operation for theft prevention. With this configuration, in addition to the effects obtained in the embodiments explained above, it is possible to improve detection accuracy of an illegal act of a customer.

After the commodity removal from the commodity shelf 4 is detected, if the cart POS 1 passing the commodity shelf 4 is detected without the commodity registration being performed, the commodity theft preventing system 9 according to this embodiment does not immediately warn, but rather warns after the predetermined time elapses from when the cart POS 1 passing the commodity shelf 4 was detected. With this configuration, it is possible to reduce unnecessary warnings to a customer who does shopping while moving about the store.

It is also possible to realize embodiments in which, if the cart POS 1 passing the commodity shelf 4 is detected, a likelihood of a theft is informed by initially performing a warning urging a commodity reading, but, after the predetermined time elapses from when the cart POS 1 passing the commodity shelf 4 was detected, a theft warning or notification is made.

Fourth Embodiment

In the embodiments explained above, a commodity theft preventing system 9 that executes a warning operation according to whether commodity registration for a commodity removed from a commodity shelf 4 has been performed was illustrated and explained. However, embodiments are not limited to this. For example, a warning operation may be executed according to whether a commodity, for which a commodity registration has been cancelled, is returned to a commodity shelf 4.

The take-out detecting unit 301 detects, by referring to the commodity list 203, whether a commodity, the commodity registration for which has been cancelled, is returned to the commodity shelf 4. The reading detecting unit 302 detects, by referring to the commodity list 204, whether there is a commodity (a cancelled commodity) for which the commodity registration has been cancelled. The time measuring unit 303a measures an elapsed time from when the cancelled commodity is detected. The elapsed time from when the commodity was cancelled, is detected is an example of a third elapsed time. In other words, the detection of the removed commodity in the embodiments explained above can be substituted for the detection of a commodity cancellation (that is, a cancelled commodity). The detection of the read (registered) commodity among the commodities removed from the commodity shelves 4 in the embodiments described above can be replaced with the detection of the return of the cancelled commodity to a commodity shelf 4.

In this way, after the cancellation of the commodity registration is detected, if the predetermined time elapses without the cancelled commodity being returned to the commodity shelf 4 or, alternatively, if the cart POS 1 passes beyond commodity shelf 4, the commodity theft preventing system 9 according to this fourth embodiment causes the cart POS 1 and the warning device 7 to execute the warning operation for theft prevention. With this configuration, the similar effects as those of the embodiments described above can be obtained when a commodity registration is modified by the cancellation of one or more previously registered commodities.

The technique according to this fourth embodiment can be combined with the techniques according to the other embodiments explained above.

According to at least one of the embodiments explained above, it is possible to provide an information processing apparatus, an information processing system, an information processing method, and an information processing program that can reduce theft of a commodity.

The information processing apparatus and the information processing terminal in these embodiments may include a control device such as a CPU, storage devices such as a ROM (Read Only Memory) and a RAM, external storage devices such as an HDD and a CD drive device, a display device such as a display, and input devices such as a keyboard and a mouse. The information processing apparatus and the information processing terminal in these embodiments may have a hardware configuration of a general-purpose computer.

The programs executed in the information processing apparatus and the information processing terminal in this embodiment may be recorded in a computer-readable recording medium such as a CD-ROM, a flexible disk (FD), a CD-R, or a DVD (Digital Versatile Disk) and provided as a file of an installable format or an executable format.

The programs executed in the information processing apparatus and the information processing terminal in this embodiment may be stored on a computer connected to a network, such as the Internet, and downloaded through the network. The programs executed in the information processing apparatus and the information processing terminal in the present disclosure may be provided or distributed through a network such as the Internet.

In some examples, programs executed in the information processing apparatus and the information processing terminal may be incorporated in a ROM or the like in advance.

The server side commodity theft preventing program executed in an information processing apparatus in an embodiment can be considered to have a module configuration including the units explained above (e.g., the take-out detecting unit 301, the reading detecting unit 302, the time measuring unit 303*a*, the passage detecting unit 303*b*, and the notifying unit 304). In such an example, the CPU (or other processor) reads out a server side commodity theft preventing program from a storage medium and loads program instructions for the various units on a main storage device or a main memory. Consequently, the take-out detecting unit 301, the reading detecting unit 302, the time measuring unit 303*a*, the passage detecting unit 303*b*, and the notifying unit 304 are generated on the main storage device.

The client side commodity theft preventing program executed in an information processing terminal in this disclosure can be considered to have a module configuration including the units explained above (e.g., the commodity registering unit 1301 and the warning unit 1302). The CPU (or other processor) reads out the client side commodity theft preventing program from a storage medium and loads program instructions for the various units on a main storage device or a main memory. Consequently, the commodity registering unit 1301 and the warning unit 1302 are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus for theft prevention in a retail store including store display shelves with commodity detectors and passage sensors, the apparatus comprising:
    a communication interface connectable to a mobile point-of-sale terminal and a plurality of store display shelves having commodity detectors and passage sensors;
    a database configured to store a first list of commodities determined as having been removed from a store display shelf based on output of a commodity detector of the store display shelf and a second list of commodities registered by a customer in a sales transaction using the mobile point-of-sale terminal; and
    a processor configured to:
        detect that a commodity has been removed from the store display shelf based on entry of the commodity on the first list;
        detect a registration of the commodity by the customer in the sales transaction based on entry of the commodity on the second list;
        measure a first elapsed time from the time of detecting that the commodity has been removed from the store display shelf; and
        cause an output of warning notification information to the mobile point-of-sale terminal via the communication interface if the first elapsed time exceeds a first predetermined threshold time without the registration of the commodity being detected, wherein
    the database is further configured to store information from the passage sensors indicating whether the mobile point-of-sale terminal is presently in front of the store display shelf, and
    the processor is further configured to:
        detect the mobile point-of-sale terminal has passed the store shelf display by referencing a list of mobile point-of-sale terminals detected by the passage sensors as passing a first passage sensor of the store shelf display without passing a second passage sensor of the store shelf display in the database,
        measure a second elapsed time from detecting the mobile point-of-sale terminal has passed the store shelf display, and
        causing the output of the warning notification information via the communication interface to the mobile point-of-sale terminal if the second elapsed time exceeds a second predetermined threshold time without the registration of the commodity being detected.

2. The information apparatus according to claim 1, wherein
    the first list is updated to reflect the commodity being returned to the store shelf display,
    the second list is updated to reflect a cancelled registration of the commodity, and
    the processor is further configured to:
        measure a third elapsed time from when the registration of the commodity is cancelled, and
        causing the output of the warning notification information if the third elapsed time exceeds a third predetermined threshold time before the first list is updated to reflect the return of the commodity to the store display shelf.

3. The information processing apparatus according to claim 1, wherein the processor is further configured to:
    cause a theft notification to be output to a store clerk warning device via the communication interface if the first elapsed time exceeds a second predetermined threshold time without the registration of the commodity being detected, the second predetermined threshold time being greater than the first predetermined threshold time.

4. The information processing apparatus according to claim 1, wherein
    the warning notification information is transmitted to the mobile point-of-sale terminal and a store clerk warning device via the communication interface.

5. The information processing apparatus according to claim 1, wherein the processor is a central processing unit.

6. The information processing apparatus according to claim 1, wherein the warning notification information is output via the communication interface to each of the mobile point-of-sale terminal, a warning device on the store display shelf, and a store clerk warning device.

7. An information processing apparatus for theft prevention in a retail store including store display shelves with commodity detectors and passage sensors, the apparatus comprising:
    a communication interface connectable to a mobile point-of-sale terminal and a plurality of store display shelves having commodity detectors and passage sensors
    a database configured to store a first list of commodities determined as having been removed from a store display shelf based on output of a commodity detector of the store display shelf, a second list of commodities registered by a customer in a sales transaction using the mobile point-of-sale terminal, and a third list of mobile point-of-sale terminals detected as being in front of the store display shelf based on output of a passage sensor of the store display shelf; and
a processor configured to:
  detect that a commodity has been removed from the store display shelf based on entry of the commodity on the first list;
  detect a registration of the commodity by the customer in the sales transaction based on entry of the commodity on the second list;
  detect a passing of the mobile point-of-sale terminal past the store display shelf based on entry of the mobile terminal on the third list;
  measure a first elapsed time from the time of detecting the passing of the mobile point-of-sale terminal past the store display shelf;
  measure a second elapsed time from detecting by the commodity detector the commodity being removed from the store shelf display; and
  cause an output of warning notification information to the mobile point-of-sale device after the passing of the mobile point-of-sale terminal past the store display shelf is detected without the registration of the commodity being detected, wherein the output of warning notification occurs only after the first elapsed time exceeds a first predetermined threshold time without the registration of the commodity being detected and the second elapsed time exceeds a second predetermined threshold time without the registration of the commodity being detected.

8. The information apparatus according to claim 7, wherein
the first list is updated to reflect the commodity being returned to the store shelf display,
the second list is updated to reflect a cancelled registration of the commodity, and
the processor is further configured to:
  measure a third elapsed time from when the registration of the commodity is cancelled.

9. The information processing apparatus according to claim 7, wherein the processor is further configured to:
  cause a theft notification to be output to a store clerk warning device via the communication interface if the first elapsed time exceeds a third predetermined threshold time without the registration of the commodity being detected, the third predetermined threshold time being greater than the first predetermined threshold time.

10. The information processing apparatus according to claim 7, wherein
the warning notification information is transmitted to the mobile point-of-sale terminal and a store clerk warning device via the communication interface.

11. An information processing method for theft prevention in a retail store including store display shelves having commodity detectors and passage sensors, the method comprising:
  detecting that a commodity has been removed from a store display shelf by a customer based on entry of the commodity on a first list stored in a database, the first list listing commodities determined as having been removed from the store display shelf based on output of a commodity detector of the store display shelf;
  detecting a registration of the commodity by the customer in a sales transaction based on entry of the commodity on a second list stored in the database, the second list listing commodities registered by the customer using a mobile point-of-sale terminal;
  measuring a first elapsed time from the time of detecting that the commodity has been removed from the store display shelf;
  causing an output of warning notification information to the mobile point-of-sale terminal if the first elapsed time exceeds a first predetermined threshold time without the registration of the commodity being detected;
  detecting the mobile point-of-sale terminal has passed the store shelf display based on a list of mobile point-of-sale terminals detected as passing a first passage sensor of the store shelf display without passing a second passage sensor of the store shelf display in the database;
  measuring a second elapsed time from detecting the mobile point-of-sale terminal has passed the store shelf; and
  causing the output of the warning notification information to the mobile point-of-sale terminal if the second elapsed time exceeds a second predetermined threshold time without the registration of the commodity being detected.

12. The method according to claim 11, wherein
the first list is updated to reflect the commodity being returned to the store shelf display,
the second list is updated to reflect a cancelled registration of the commodity, and
the method further comprises:
measuring a third elapsed time from when the registration of the commodity is cancelled; and
causing the output of the warning notification information if the third elapsed time exceeds a third predetermined threshold time before the first list is updated to reflect the return of the commodity to the store display shelf.

13. The method according to claim 11, wherein the warning notification information is transmitted to the mobile point-of-sale terminal via a communication interface.

14. The method according to claim 11, further comprising: causing
a theft notification to be output if the first elapsed time exceeds a third predetermined threshold time without the registration of the commodity being detected, the predetermined threshold time being greater than the first predetermined threshold time.

15. The method according to claim 14, wherein the theft notification information is transmitted to the mobile point-of-sale terminal and a store clerk warning device via a communication interface.

16. The method according to claim 11, wherein the mobile point-of-sale terminal is a cart-based point-of-sale terminal.

* * * * *